United States Patent
Jareño Diz Lois

(10) Patent No.: US 9,248,900 B2
(45) Date of Patent: Feb. 2, 2016

(54) TIP FAIRING OF A HORIZONTAL AIRFOIL OF AN AIRCRAFT

(71) Applicant: Airbus Operations S.L., Madrid (ES)

(72) Inventor: José Juan Jareño Diz Lois, Madrid (ES)

(73) Assignee: AIRBUS OPERATIONS S.L., Madrid (ES)

(*) Notice: Subject to any disclaimer, the term of this patent is extended or adjusted under 35 U.S.C. 154(b) by 301 days.

(21) Appl. No.: 14/044,388

(22) Filed: Oct. 2, 2013

(65) Prior Publication Data

US 2014/0103160 A1    Apr. 17, 2014

(30) Foreign Application Priority Data

Oct. 3, 2012    (EP) .................................... 12382384

(51) Int. Cl.
| | | |
|---|---|---|
| B64C 1/00 | (2006.01) | |
| B64C 3/18 | (2006.01) | |
| B64C 3/24 | (2006.01) | |
| B64C 7/00 | (2006.01) | |
| B64C 3/26 | (2006.01) | |
| B64D 45/02 | (2006.01) | |

(52) U.S. Cl.
CPC . B64C 3/18 (2013.01); B64C 3/185 (2013.01); B64C 3/24 (2013.01); B64C 3/26 (2013.01); B64C 7/00 (2013.01); B64D 45/02 (2013.01); *Y10T 29/49826* (2015.01)

(58) Field of Classification Search
USPC ........... 244/123.1, 123.2, 124, 2, 35 R, 118.2
See application file for complete search history.

(56) References Cited

U.S. PATENT DOCUMENTS

| | | | | |
|---|---|---|---|---|
| 2,383,635 A | * | 8/1945 | Watter ...................... | B64C 3/00 244/123.1 |
| 3,273,833 A | * | 9/1966 | Windecker ................ | B64C 3/26 244/123.5 |
| 4,095,760 A | * | 6/1978 | Sommer ................... | B64C 3/26 156/85 |
| 5,407,153 A | * | 4/1995 | Kirk ...................... | B64C 23/065 244/199.4 |
| 8,544,800 B2 | * | 10/2013 | Stuhr ..................... | B64C 23/065 244/124 |
| 2003/0042364 A1 | * | 3/2003 | Tanaka ..................... | B64C 3/20 244/123.2 |
| 2003/0192990 A1 | | 10/2003 | Simpson et al. | |
| 2006/0104812 A1 | | 5/2006 | Kovalsky et al. | |
| 2007/0018049 A1 | | 1/2007 | Stuhr | |
| 2012/0112005 A1 | * | 5/2012 | Chaussee ............... | B64C 23/065 244/123.1 |
| 2015/0028160 A1 | * | 1/2015 | Roncz ................... | B64C 23/065 244/199.4 |
| 2015/0203190 A1 | * | 7/2015 | Witte .................... | B64C 23/065 244/199.4 |

OTHER PUBLICATIONS

European Searching Authority, European Search Report for EP 12 38 2384 Dated Mar. 25, 2013.

* cited by examiner

*Primary Examiner* — Christopher P Ellis
(74) *Attorney, Agent, or Firm* — Ingrassia Fisher & Lorenz, P.C.

(57) ABSTRACT

A tip fairing of a horizontal airfoil of an aircraft is provided. The tip fairing comprises stiffening elements and a skin covering the stiffening elements. The stiffening elements comprise a central web and two flanges located at the tips of the web, with contact between the skin and the stiffening elements being made through the flanges of the stiffening elements. The tip fairing is manufactured from a composite material, is manufactured from a single part, and the planes defining the webs of any pair of stiffening elements taken in twos form an angle less than about 30°.

18 Claims, 3 Drawing Sheets

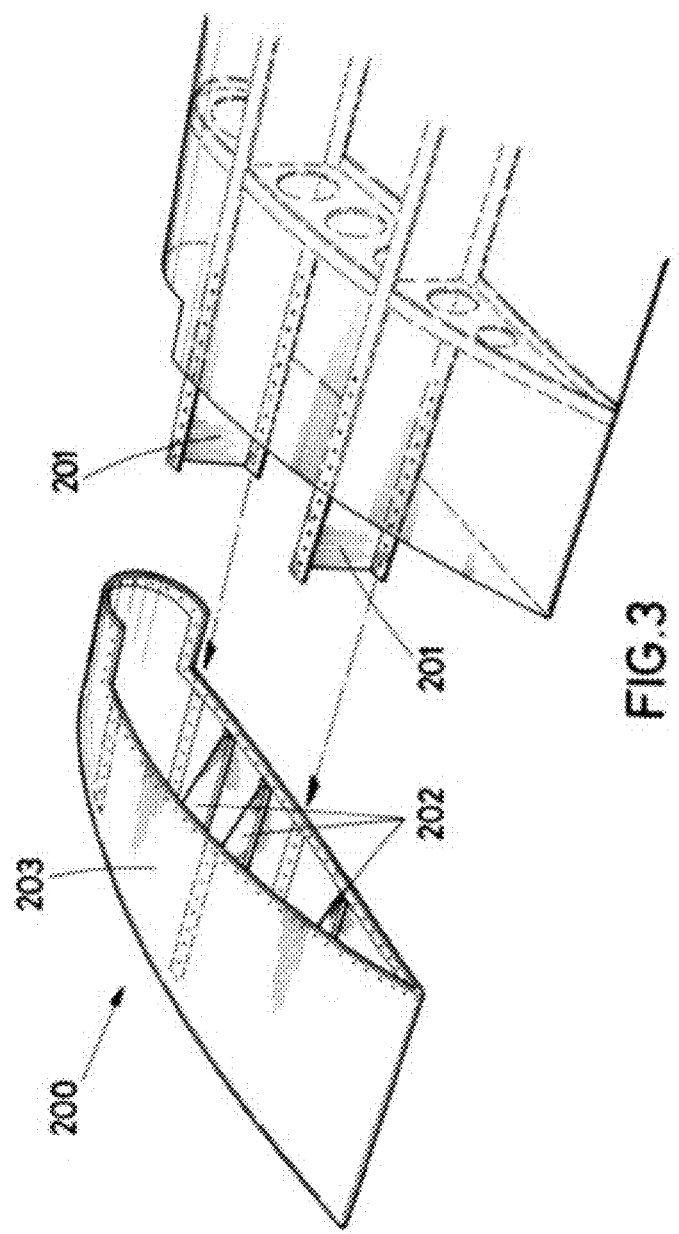

TIP FAIRING OF A HORIZONTAL AIRFOIL OF AN AIRCRAFT

CROSS-REFERENCE TO RELATED APPLICATION

This application claims priority to European Patent Application No. EP12382384.1, filed Oct. 3, 2012, which is incorporated herein by reference in its entirety.

TECHNICAL FIELD

This application pertains to parts forming the structure of an aircraft, in particular, the technical field relates to the tip fairing of a horizontal airfoil.

BACKGROUND

The manufacture of an aircraft includes designing and assembling very different parts. These parts have very different weight and stress requirements due to the particular characteristics of the structures on which they are assembled.

The tip fairing of a horizontal airfoil of the aircraft is among these parts. The tip fairing is placed at the tip of the horizontal airfoil that is farthest from the fuselage. The so-called "torsion box", which is what withstands the loads of the horizontal airfoil, is closed by means of the fairing.

There are two types of requirements for the tip fairing of the horizontal airfoil: external and internal. Externally, the fairing must be able to be designed following the required aerodynamic profile and minimizing weight as it is a part to be assembled in aircraft structures. Internally it must assure a stiffness characteristic of the site in which it is located and it must enable attachment with the rest of the airfoil in a simple and safe manner.

All the fairings of this type manufactured today are made of metal (usually aluminum) and are made up of a series of elements, such as skin, stringers, ribs, rivets and welded attachments. A part with a known structure that is readily compatible with and connectable to the rest of the airfoil is thereby achieved.

Nevertheless, these fairings are heavy because they are manufactured from metal materials. Furthermore, their manufacture and maintenance have the complexity derived from being the result of the attachment of different elements. Precisely the fact that they are the result of the attachment of several elements is also a source of the problems relating to assembling and changing the fairing when repair is needed because the fairing is built from a number of elements with their respective tolerances and their respective attachments.

Other objects, desirable features and characteristics will become apparent from the subsequent summary and detailed description, and the appended claims, taken in conjunction with the accompanying drawings and this background.

SUMMARY

In one of various aspects, the present disclosure defines a tip fairing of a horizontal airfoil of an aircraft, comprising stiffening elements and a skin covering the stiffening elements, the stiffening elements comprising a central web and two flanges located at the tips of the web, contact between the skin and the stiffening elements being made through the flanges of the stiffening elements, characterized in that it: is manufactured from a composite material; is manufactured from a single part, and in that the planes defining the webs of any pair of stiffening elements taken in twos form an angle less than about 30°.

Throughout the entire document "composite material" must be understood as any type of material comprising two or more physically distinguishable and mechanically separable components such that both are indissoluble with respect to one another.

In one exemplary embodiment of the present disclosure, the stiffening elements are substantially parallel to one another.

In another exemplary embodiment of the present disclosure, the fairing comprises two attachment areas each intended for receiving an attachment rib for attaching the fairing to the torsion box of a horizontal airfoil, at least one stiffening element being located between the two attachment areas and at least one stiffening element being located between the trailing edge of the fairing and the attachment area that is closest to said trailing edge. Advantageously, the fairing is able to withstand the service loads comprising stiffening elements in a single direction by means of this configuration.

In one exemplary embodiment of the present disclosure, the fairing comprises a plurality of holes in the attachment areas suitable for fixing an attachment rib.

In one embodiment of the present disclosure, the fairing comprises a metal plate adhered to the leading edge of the fairing to prevent erosion of the leading edge of the fairing.

In another embodiment of the present disclosure, the fairing is made of a composite material comprising carbon fiber. Advantageously, the weight of the fairing made of this material is less than in the case of the traditional model manufactured from metal. In one of various embodiments, the fairing comprises a bronze mesh covering the skin. In one embodiment, the fairing comprises a series of antenna shaped electrostatic discharge protection elements manufactured from aluminum or another conducting material.

In another exemplary embodiment of the present disclosure, the fairing is made of a composite material comprising glass fiber. Advantageously, the fairing made of this material does not require any type of lightning or electrostatic discharge protection.

In one embodiment of the present disclosure, the composite material comprises a thermosetting resin.

In another of various aspects, an aircraft comprising a tip fairing of the horizontal airfoil according to various embodiments is provided.

In one of various aspects, a method for manufacturing a tip fairing of the horizontal airfoil of an aircraft according to various embodiments is provided, comprising: placing fibers on a mold; closing the mold; injecting a resin; and performing thermal treatment at a temperature suitable for curing the resin.

In one exemplary embodiment, the method of manufacturing comprises making holes in two attachment areas each intended for receiving an attachment rib.

In one embodiment of the present disclosure, the fibers that are placed on the mold are carbon fibers.

In another embodiment of the present disclosure, the fibers that are placed on the mold are glass fibers.

In one of various embodiments of the present disclosure, the resin that is injected is a thermosetting resin.

In one of various aspects, a method of assembling a tip fairing of the horizontal airfoil of an aircraft is provided, comprising: attaching at least two attachment ribs to the torsion box of the horizontal airfoil to which the fairing is to be attached; fitting said at least two attachment ribs by sliding into the inside of the fairing in the attachment areas; attaching the fairing to said at least two attachment ribs, in one example, by means of rivets or screws.

All the technical features described in this specification (including the claims, description and drawings) and/or the steps of methods can be combined in any combination, except combinations of such mutually exclusive features.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 3 shows a perspective view showing the attachment between the tip fairing and the torsion box of the airfoil according to various embodiments.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
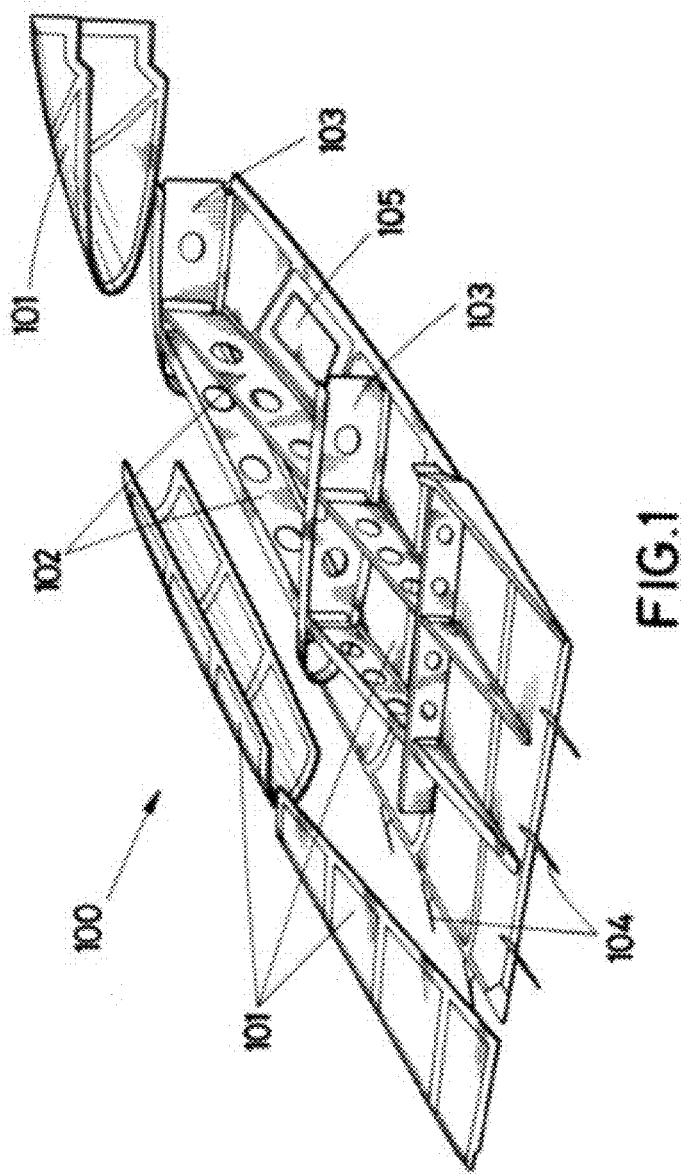
FIG. 1 shows a perspective view of a traditional design of tip fairing of a horizontal airfoil according to the state of the art.

The present disclosure presents a fairing for the tip of a horizontal airfoil of an aircraft. FIG. 1 shows a fairing (100) for the tip of a horizontal airfoil of an aircraft as traditionally manufactured in the state of the art. The figure shows the different elements—skin (101), stringers (102) and ribs (103)—that must be assembled to configure the fairing (100).

In addition to the structural elements forming the fairing (100), other non-structural auxiliary elements are necessary, such as an access door (105) which is necessary for an operator to attach the fairing (100) and the horizontal airfoil (the torsion box), as well as a number of anti-electrostatic discharge elements (104).

Figure 2:
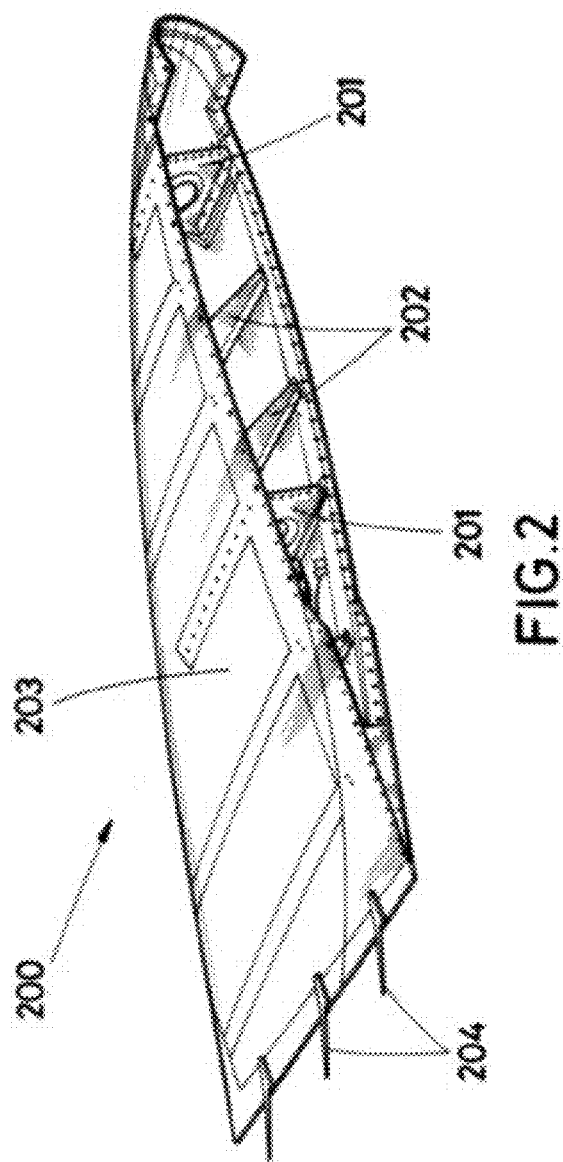
FIG. 2 shows a perspective view of a tip fairing of a horizontal airfoil according to various embodiments.

FIG. 2 shows a fairing (200) according to the various embodiments of the present disclosure made of a single part by means of the RTM (Resin Transfer Molding) procedure, in which the stiffening elements (202) and the skin (203) can be distinguished, despite not being divisible parts.

While the fairings of the state of the art have stiffening elements arranged in two substantially perpendicular directions (the stringers (102) and ribs (103) visible in the fairing of FIG. 1), in the fairing (200) of the present disclosure all the stiffening elements (202) are oriented substantially in the same direction, which makes the process of manufacturing the fairing (200) easier as it is not necessary to use soluble or fusible cores for demolding the fairing, which would be indispensable if a fairing (100) such as that of FIG. 1 were made from a composite material.

These stiffening elements (202) are in the form of a C channel with a height that adapts to the shape of the skin, such that its height decreases the further away from the torsion box.

Attachment ribs (201) are used to attach the fairing (200) to a torsion box of an airfoil. The section of the attachment ribs (201) is generally C-shaped and said attachment ribs (201) comprise holes to lighten the weight.

The fairing (200) of the exemplary embodiment of FIG. 2 has: two attachment areas intended for receiving two attachment ribs (201), two stiffening elements between said attachment areas and another two stiffening elements between the trailing edge and the attachment area intended for receiving the attachment rib (201) closest to said edge.

FIG. 3 shows how the fairing (200) and the rest of the horizontal airfoil are attached by means of sliding the attachment ribs (201), previously fixed to said torsion box, inside the fairing (200). Once fitted, a riveted attachment is established as a result of the prior existence of a series of holes in each of the attachment areas of the skin of the fairing (200).

Advantageously, this attachment mode between the fairing (200) and the torsion box allows the assembly mode of the fairing to not require an operator getting inside the fairing, so the addition of an access door in the fairing is prevented.

The attachment ribs (201) are thicker than the stiffening elements (202) to allow placing the rivets, screws or any other type of attachment element, something that is not necessary in the stiffening elements (202) because they are integrated as a single part with the skin (203). To that end, these stiffening elements are lighter and simpler than traditional ribs and stringers used in the fairings of the state of the art.

The option to use composite material to manufacture the fairing (200) reduces the necessary amount of lightning and electrostatic discharge protection elements with respect to the traditional design in a metallic material. In fact, if the composite material used in manufacturing the fairing comprises glass fiber, no type of lightning or electrostatic discharge protection is necessary. If the composite material used comprises carbon fiber, lightning protection is achieved by means of a covering with a bronze mesh structure. Electrostatic discharge protection is achieved by means of small protection elements (204) located in the trailing edge of the fairing, it not being necessary to place so many of them or to place them in the same location as in the case of the traditional fairing made of a metallic material, thereby causing less drag. In one exemplary embodiment, the fairing (200) has a metal sheet adhered to its leading edge to prevent paint erosion in this area.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A tip fairing of a horizontal airfoil of an aircraft, comprising:
a plurality of stiffening elements each including a central web and two flanges located at the tips of the web; and
a skin covering the plurality of stiffening elements with contact between the skin and the plurality of stiffening elements being made through the flanges of the plurality of stiffening elements,
wherein the tip fairing is manufactured from a composite material, is manufactured from a single part, and the planes defining the central webs of any pair of the plurality of stiffening elements taken in twos form an angle less than about 30°.

2. The tip fairing of the horizontal airfoil of the aircraft according to claim 1, wherein the plurality of stiffening elements are substantially parallel.

3. The tip fairing of the horizontal airfoil of the aircraft according to claim 2, comprising two attachment areas each intended for receiving an attachment rib for attaching the tip fairing to a torsion box of a horizontal airfoil, at least one of the plurality of stiffening elements being located between the two attachment areas and at least one of the plurality of stiffening elements being located between a trailing edge of the tip fairing and the attachment area that is closest to said trailing edge.

4. The tip fairing of the horizontal airfoil of the aircraft according to claim 3, having a plurality of holes in the attachment areas suitable for fixing an attachment rib.

5. The tip fairing of the horizontal airfoil of the aircraft according to claim 3, having a plurality of holes suitable for fixing the tip fairing to the rest of the horizontal airfoil.

6. The tip fairing of the horizontal airfoil of the aircraft according to claim 3, comprising a metal plate adhered to a leading edge of the tip fairing to prevent erosion of the leading edge of the tip fairing.

7. The tip fairing of the horizontal airfoil of the aircraft according to claim 1, where the composite material from which said tip fairing is manufactured comprises glass fiber.

8. The tip fairing of the horizontal airfoil of the aircraft according to claim 3, where the composite material from which said tip fairing is manufactured comprises carbon fiber.

9. The tip fairing of the horizontal airfoil of the aircraft according to claim 8, comprising a bronze mesh covering the skin.

10. The tip fairing of the horizontal airfoil of the aircraft according to claim 8, comprising a plurality of electrostatic discharge protection elements located in the trailing edge of the fairing, each of the plurality of electrostatic discharge protection elements manufactured from a conducting material.

11. An aircraft, comprising
a tip fairing of a horizontal airfoil including:
plurality of stiffening elements each including a central web and two flanges located at the tips of the web; and
a skin covering the plurality of stiffening elements, with contact between the skin and the plurality of stiffening elements being made through the flanges of the plurality of stiffening elements;
a metal plate adhered to a leading edge of the tip fairing to prevent erosion of the leading edge of the tip fairing,
wherein the tip fairing is manufactured from a composite material, is manufactured from a single part, and the planes defining the central webs of any pair of the plurality of stiffening elements taken in twos form an angle less than about 30°.

12. A method of assembling a fairing at a tip of the a horizontal airfoil of an aircraft according to claim 3, comprising:
attaching at least two attachment ribs to a torsion box of the horizontal airfoil to which the fairing is to be attached;
fitting said at least two attachment ribs by sliding into an inside of the fairing in attachment areas;
attaching the fairing to said at least two attachment ribs; and
attaching the fairing to a remainder of the horizontal airfoil.

13. The method of assembling a fairing according to claim 12, wherein the fairing is fixed to at least one of the attachment ribs and the remainder of the horizontal airfoil by means of rivets or screws.

14. The aircraft according to claim 11, comprising a metal plate adhered to a leading edge of the tip fairing to prevent erosion of the leading edge of the tip fairing.

15. The aircraft according to claim 11, where the composite material from which said tip fairing is manufactured comprises glass fiber.

16. The aircraft according to claim 11, where the composite material from which said tip fairing is manufactured comprises carbon fiber.

17. The aircraft according to claim 16, comprising a bronze mesh covering the skin.

18. The aircraft according to claim 16, comprising a plurality of electrostatic discharge protection elements located in a trailing edge of the fairing, each of the plurality of electrostatic discharge protection elements manufactured from a conducting material.

* * * * *